US008923933B2

(12) United States Patent
Hu

(10) Patent No.: US 8,923,933 B2
(45) Date of Patent: Dec. 30, 2014

(54) METHOD AND APPARATUS FOR REDUCING POWER CONSUMPTION OF MOBILE PHONE, AND MOBILE PHONE

(71) Applicant: Huawei Device Co., Ltd, Shenzhen (CN)

(72) Inventor: Jun Hu, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/902,753

(22) Filed: May 24, 2013

(65) Prior Publication Data
US 2013/0260843 A1 Oct. 3, 2013

Related U.S. Application Data

(63) Continuation of application No. PCT/CN2011/074572, filed on May 24, 2011.

(51) Int. Cl.
*H04M 1/00* (2006.01)
*H04W 52/02* (2009.01)
*H04M 1/22* (2006.01)

(52) U.S. Cl.
CPC ...... *H04W 52/0209* (2013.01); *H04W 52/0254* (2013.01); *H04M 1/22* (2013.01); *H04M 2250/12* (2013.01); *Y02B 60/50* (2013.01)
USPC ............................. 455/574; 455/418; 455/566

(58) Field of Classification Search
None
See application file for complete search history.

(56) References Cited

U.S. PATENT DOCUMENTS

| 2007/0004470 | A1 | 1/2007 | Goris et al. |
| 2007/0085157 | A1 | 4/2007 | Fadell et al. |
| 2008/0070639 | A1 | 3/2008 | Goris et al. |
| 2009/0171608 | A1 | 7/2009 | Handa |
| 2011/0006190 | A1 | 1/2011 | Alameh et al. |

FOREIGN PATENT DOCUMENTS

| CN | 101470177 A | 7/2009 |
| CN | 101558372 A | 10/2009 |
| CN | 201523407 U | 7/2010 |

OTHER PUBLICATIONS

International Search Report for Application No. PCT/CN2011/074572, mailed Mar. 1, 2012, 19 pages.
Chinese Office Action received in Application No. 201180000634.1, Applicant: Huawei Technologies Co., Ltd., mailed Aug. 29, 2012, 5 pages.
Extended European Search Report, Application No. 11782987.9, dated Jan. 2, 2014, 8 pages.

*Primary Examiner* — Erika A Washington
(74) *Attorney, Agent, or Firm* — Slater & Matsil, L.L.P.

(57) ABSTRACT

Embodiments of the present invention provide a method and an apparatus for reducing power consumption of a mobile phone and also a mobile phone. The method includes: activating a proximity sensor of a mobile phone when a call is originated or received; obtaining a weighted acceleration of the mobile phone by using an acceleration sensor; determining a switch-on time point of the proximity sensor according to the weighted acceleration of the mobile phone; and switching on the proximity sensor at the switch-on time point so that a backlight of the mobile phone is in an on state or an off state according to a detection result of the proximity sensor. In this way, an appropriate switch-on time point may be obtained according to different weighted accelerations of the mobile phone, so as to reduce power consumption of the mobile phone in a conversation.

20 Claims, 4 Drawing Sheets

METHOD AND APPARATUS FOR REDUCING POWER CONSUMPTION OF MOBILE PHONE, AND MOBILE PHONE

CROSS-REFERENCE TO RELATED APPLICATIONS

This application is a continuation of International Application No. PCT/CN2011/074572, filed on May 24, 2011, which are hereby incorporated by reference in their entireties.

TECHNICAL FIELD

The present invention relate to the field of communications technologies, and in particular, to a method and an apparatus for reducing power consumption of a mobile phone, and a mobile phone.

BACKGROUND

With the development of smart phones, mobile phones are more and more important in people's daily life. The application of mobile phones is increasing, and the time people spend in using mobile phones every day is increasing. Under such a background, how to prolong the standby time of a mobile phone or reduce power consumption of a mobile phone becomes a more and more important issue. A proximity sensor for reducing power consumption of a mobile phone in a conversation is a good means of reducing power consumption.

Some smart phones such as an iphone now use a proximity sensor to reduce power consumption of the mobile phone in a conversation. The method for reducing power consumption may be as follows: when a call is originated or received, a proximity sensor is switched on periodically; after being switched on, the proximity sensor may emit infrared rays at intervals and use reflected infrared rays to determine whether the mobile phone approaches a human face; if the mobile phone approaches a human face, a backlight is turned off to reduce power consumption of the mobile phone; if the mobile phone leaves the human face, the backlight is turned on so that a user operates the mobile phone with the backlight. Therefore, when the user holds up the mobile phone and moves it to an ear to talk, the mobile phone turns off the backlight automatically to reduce power consumption of the mobile phone; in a conversation, when the user moves the mobile phone away from the ear to operate the mobile phone, the mobile phone turns on the backlight automatically. In this way, the power consumption of the mobile phone is reduced without affecting the user operation.

In the prior art, a proximity sensor in a conversation is switched on and off at fixed intervals, and emits an infrared ray at intervals to detect a distance between the mobile phone and the human face. For example, after the proximity sensor is switched on and continues for 50 ms, the proximity sensor is switched off, and then switched on again after a fixed interval (generally 200 ms). While being switched on, the proximity sensor emits infrared rays in the form of pulses. In the prior art, the interval from switching off the proximity sensor to switching on the proximity sensor is fixed. In order to detect in time whether the mobile phone approaches or leaves the human face, the interval is generally small. However, the small interval causes the proximity sensor to be frequently switched on and emit infrared rays, which increases power consumption of the mobile phone.

SUMMARY OF THE INVENTION

Embodiments of the present invention provide a method and an apparatus for reducing power consumption of a mobile phone and also a mobile phone, which may reduce power consumption of the mobile phone in a conversation.

An embodiment of the present invention provides a method for reducing power consumption of a mobile phone, including activating a proximity sensor of a mobile phone when a call is originated or received, obtaining a weighted acceleration of the mobile phone by using an acceleration sensor, determining a switch-on time point of the proximity sensor according to the weighted acceleration of the mobile phone, and switching on the proximity sensor at the switch-on time point so that a backlight of the mobile phone is turned on or off according to a detection result of the proximity sensor.

An embodiment of the present invention provides an apparatus for reducing power consumption of a mobile phone, including an activating module, configured to activate a proximity sensor of a mobile phone when a call is originated or received, an acceleration obtaining module, configured to obtain a weighted acceleration of the mobile phone by using an acceleration sensor, a time point determining module, configured to determine a switch-on time point of the proximity sensor according to the weighted acceleration of the mobile phone, and a switch-on module, configured to switch on the proximity sensor at the switch-on time point so that a backlight of the mobile phone is turned on or off according to a detection result of the proximity sensor.

An embodiment of the present invention provides a mobile phone, including any one apparatus for reducing power consumption of a mobile phone that is provided in an embodiment of the present invention.

With the method and apparatus for reducing power consumption of a mobile phone and also the mobile phone in the embodiments of the present invention, when a call is originated or received, a proximity sensor of the mobile phone is activated, a weighted acceleration of the mobile phone is obtained by using an acceleration sensor, and then a switch-on time point of the proximity sensor is determined according to the weighted acceleration of the mobile phone; the proximity sensor is switched on at the switch-on time so that a backlight of the mobile phone is turned on or off according to a detection result of the proximity sensor. In the embodiments, in a conversation process of the mobile phone, the switch-on time point of the proximity sensor may be obtained according to the weighted acceleration of the mobile phone, and, at the switch-on time point, the proximity sensor is switched on to detect a distance between the mobile phone and the human face and hence decide to turn on or off the backlight of the mobile phone. In this way, an appropriate switch-on time point is obtained according to different weighted accelerations of the mobile phone, and, when the mobile phone is not moving, the switch-on time point may be deferred so as to reduce power consumption of the mobile phone in a conversation process.

BRIEF DESCRIPTION OF THE DRAWINGS

To describe the technical solutions in the embodiments of the present invention more clearly, the following briefly introduces the accompanying drawings needed for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
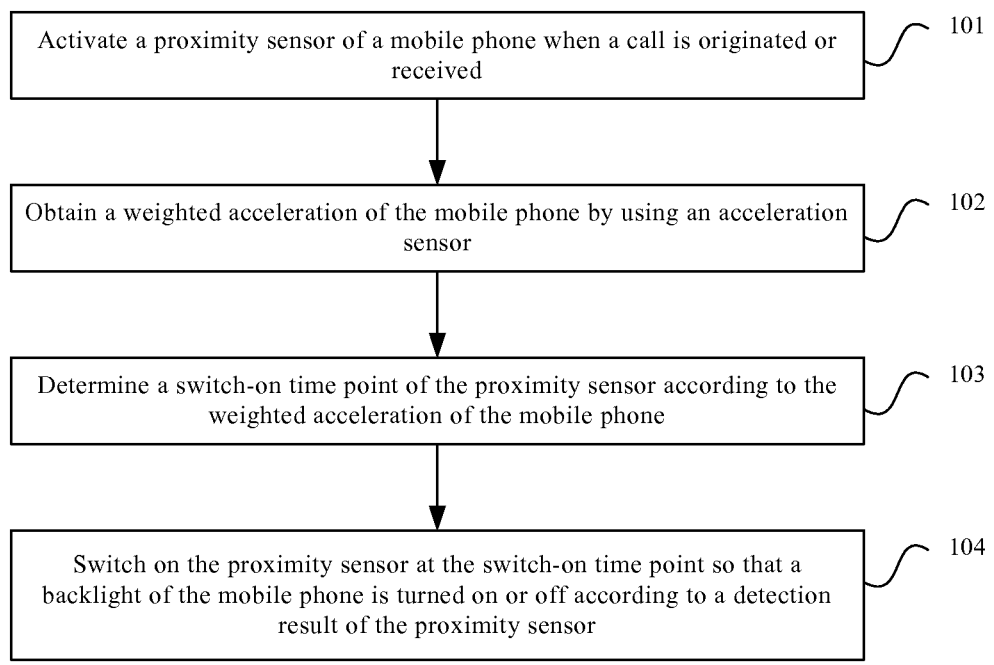
FIG. 1 is a flowchart of a method for reducing power consumption of a mobile phone according to Embodiment 1 of the present invention.

FIG. 1 is a flowchart of a method for reducing power consumption of a mobile phone according to Embodiment 1 of the present invention. As shown in FIG. 1, the method includes.

Step 101: Activate a proximity sensor of a mobile phone when a call is originated or received.

The mobile phone may be used as an exemplary entity for performing the embodiment.

The proximity sensor of the mobile phone may be activated when a call is originated or received. Further, when a call is originated or received, a judgment may be made first to check whether the mobile phone is working in an earpiece mode or a hands free mode, and the proximity sensor of the mobile phone is activated when the mobile phone is in neither the earpiece mode nor the hands free mode.

When a call is originated or received, a judgment may be made first to check whether the weighted acceleration of the mobile phone is greater than or equal to a preset threshold; and the proximity sensor of the mobile phone is activated when the weighted acceleration of the mobile phone is greater than or equal to the preset threshold.

Step 102: Obtain the weighted acceleration of the mobile phone by using an acceleration sensor.

Specifically, the weighted acceleration of the mobile phone may be obtained by using the acceleration sensor in the mobile phone. For example, a component acceleration in a first direction, a component acceleration in a second direction, and a component acceleration in a third direction of the mobile phone are obtained respectively by using the acceleration sensor in the mobile phone, and then a weighted acceleration of the mobile phone is obtained according to the component acceleration in each direction and a weight value of the component acceleration in each direction. The acceleration of the mobile phone in a movement direction may be obtained by using the acceleration sensor, and then the component acceleration of the mobile phone in each direction is obtained by calculation; or, the component acceleration of the mobile phone in each direction may be obtained directly by using the acceleration sensor. The first direction, the second direction, and the third direction are perpendicular to each other.

The judgment to check whether the mobile phone is moving in step 102 may be specifically to determine whether the weighted acceleration of the mobile phone is greater than or equal to a preset threshold; and the proximity sensor of the mobile phone is activated if the weighted acceleration of the mobile phone is greater than or equal to the preset threshold.

Step 103: Determine a switch-on time point of the proximity sensor according to the weighted acceleration of the mobile phone.

After being activated, the proximity sensor keeps emitting infrared rays, and may be switched off after a preset duration such as 50 ms (milliseconds); and then a next switch-on time point of switching on the proximity sensor may be determined according to the weighted acceleration of the mobile phone, where the switch-on time point is a time point when a specific time interval expires after the proximity sensor is switched off.

The greater the weighted acceleration of the mobile phone is, the smaller the time interval may be, and the earlier the proximity sensor may be switched on; the smaller the weighted acceleration of the mobile phone is, the greater the time interval may be, and the later the proximity sensor may be switched on, where the time interval refers to a time segment from switching off the proximity sensor to switching on the proximity sensor.

Step 104: Switch on the proximity sensor at the switch-on time point so that a backlight of the mobile phone is turned on or off according to a detection result of the proximity sensor.

The proximity sensor is switched on when the switch-on time point arrives. By emitting infrared rays, the proximity sensor may detect whether the mobile phone is approaching or leaving a human face, and decide, according to a detection result, whether to turn on or off the backlight of the mobile phone.

It should be noted that a fixed switch-on duration may be set for the proximity sensor. For example, after the proximity sensor is switched on and goes on for 50 ms, the proximity sensor is switched off. The fixed switch-on duration may be set according to actual conditions.

The detailed process of controlling an on or off state of the backlight of the mobile phone according to the result detected by the proximity sensor about whether the mobile phone is approaching or leaving the human face may be: turning off the backlight of the mobile phone if it is detected that the mobile phone is approaching the human face when a call is originated or received; turning on the backlight of the mobile phone if it is detected that the mobile phone is leaving the human face in a conversation process after it is detected that the mobile phone is approaching the human face and the backlight of the mobile phone is turned off; and turning off the backlight of the mobile phone if it is detected that the mobile phone is approaching the human face in the conversation process after the backlight of the mobile phone is turned on.

In the embodiment of the present invention, in a conversation process of the mobile phone, a switch-on time point of a proximity sensor is obtained according to a weighted acceleration of the mobile phone, and the proximity sensor is switched on according to the switch-on time point to detect whether the mobile phone is approaching or leaving a human face. In this way, an appropriate switch-on time point is obtained according to different weighted accelerations of the mobile phone, and it is not necessary to maintain a fixed switch-on time point of the proximity sensor. For example, when the mobile phone is not moving, the switch-on time point may be deferred so as to reduce power consumption of the mobile phone in a conversation.

Figure 2:
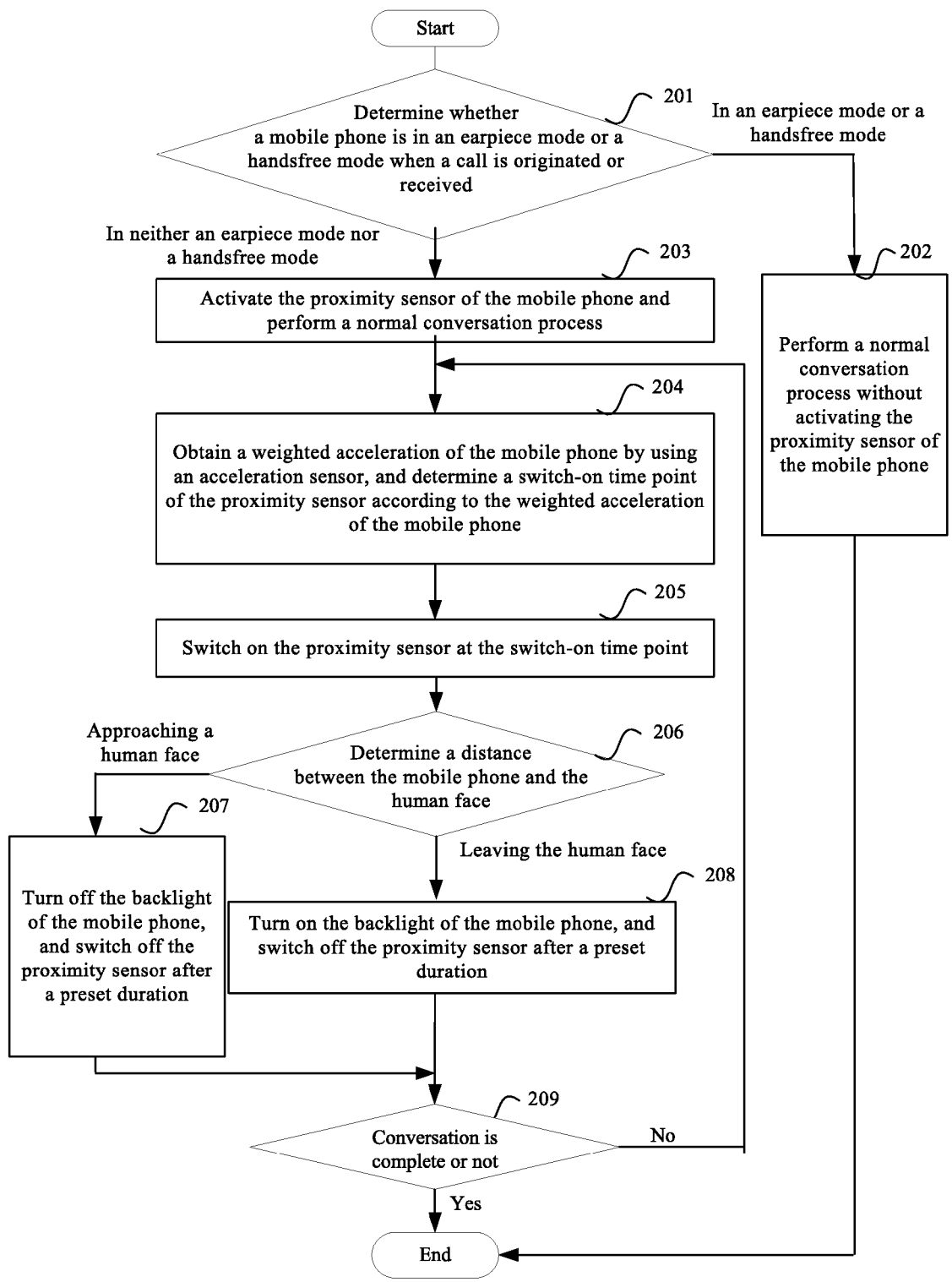
FIG. 2 is a flowchart of a method for reducing power consumption of a mobile phone according to Embodiment 2 of the present invention.

FIG. 2 is a flowchart of a method for reducing power consumption of a mobile phone according to Embodiment 2 of the present invention. As shown in FIG. 2, the method includes.

Step 201: Determine whether a mobile phone is in an earpiece mode or a hands free mode when a call is originated or received. If the mobile phone is in neither the earpiece mode nor the hands free mode, proceed to step 203; if the mobile phone is in the earpiece mode or the hands free mode, proceed to step 202.

Step 202: Perform a normal conversation process without activating the proximity sensor of the mobile phone until the conversation is completed.

Step 203: Activate the proximity sensor of the mobile phone and perform a normal conversation process.

After being activated, the proximity sensor starts to emit infrared rays, and the mobile phone may switch off the proximity sensor after a preset duration (such as 50 ms).

Step 204: Obtain a weighted acceleration of the mobile phone by using an acceleration sensor, and determine a switch-on time point of the proximity sensor according to the weighted acceleration of the mobile phone.

For the process of obtaining the weighted acceleration of the mobile phone, reference may be made to the description in step 102 in the embodiment shown in FIG. 1. The switch-on time point of the proximity sensor is a time point when a time interval expires after the proximity sensor is switched off. That is, after the time interval is obtained, a next switch-on time point of switching on the proximity sensor may be obtained according to the time point of switching off the proximity sensor.

The detailed process of obtaining the time interval according to the weighted acceleration of the mobile phone may include: obtaining a smaller time interval if the weighted acceleration of the mobile phone is greater, and obtaining a greater time interval if the weighted acceleration of the mobile phone is smaller. Further, the process of obtaining the weighted acceleration of the mobile phone may include: obtaining a component acceleration in a first direction, a component acceleration in a second direction, and a component acceleration in a third direction of the mobile phone, and then obtaining a weighted acceleration of the mobile phone according to the component acceleration in the first direction, the component acceleration in the second direction, the component acceleration in the third direction of the mobile phone, a weight value of the component acceleration in the first direction, a weight value of the component acceleration in the second direction, and a weight value of the component acceleration in the third direction.

For example, specifically, the time interval may be calculated in the following process.

Obtain the component acceleration in the first direction of the mobile phone (for example, a left-right component acceleration) $g_x$, the component acceleration in the second direction (for example, a front-back component acceleration) $g_y$, and the component acceleration in the third direction (for example, a vertical component acceleration) $g_z$, and obtain a time interval according to formula 1.

Formula 1 is: $T = T_{base} * (K_x * g_{x-base} + K_y * g_{y-base} + K_z * g_{z-base}) / (K_x * g_x + K_y * g_y + K_z * g_z)$, where T is the time interval; $T_{base}$ is a base value of the time interval; $g_x$, $g_y$, and $g_z$ are the component acceleration in the first direction, the component acceleration in the second direction, and the component acceleration in the third direction of the mobile phone, respectively; $g_{x-base}$, $g_{y-base}$, and $g_{z-base}$ are a base value of the component acceleration in the first direction, a base value of the component acceleration in the second direction, and a base value of the component acceleration in the third direction of the mobile phone, respectively; $K_x$ is a weight value in the first direction, $K_y$ is a weight value in the second direction, and $K_z$ is a weight value in the third direction; and the first direction, the second direction, and the third direction are perpendicular to each other. The third direction in the embodiment may be, for example, an upright direction, that is, a direction perpendicular to the ground; and the second direction and the third direction may be, for example, a left-right direction and a front-back direction, respectively, where the left-right direction and the front-back direction may be benchmarked against the obverse of the mobile phone. Moreover, the acceleration and each component acceleration mentioned in each embodiment of the present invention may all be absolute values. For example, the weighted acceleration may be $K_x * g_x + K_y * g_y + K_z * g_z$.

If the weighted acceleration of the mobile phone is greater, the obtained time interval should be smaller; if the weighted acceleration of the mobile phone is smaller, the obtained time interval should be greater. That is, the time interval is in inverse proportion to the weighted acceleration of the mobile phone. Further, a maximum value and a minimum value of T may be preset. For example, the minimum value is 100 ms, and the maximum value is 1000 ms, and $T_{base}$ may be 200 ms. $T_{base}$ may be adjusted according to actual conditions. In a specific embodiment, $T_{base}$ may be the same as the minimum value of T. If the time interval obtained by calculation is greater than the preset maximum value, the preset maximum value is used as the time interval; if the time interval obtained by calculation is less than the preset minimum value, the preset minimum value is used as the time interval.

Furthermore, a weighted acceleration threshold of the mobile phone may be preset. If the weighted acceleration of the mobile phone is greater than or equal to the preset threshold, the proximity sensor of the mobile phone is switched on immediately.

It should be noted that the base value and the weight value of the acceleration in each direction may be statistical values, which are obtained by collecting statistics of the use habits of common users. Specifically, in neither an earpiece mode nor a hands free mode, the user generally answers a call by moving the mobile phone to an ear, which produces an acceleration. Therefore, according to the use habits of most users, the acceleration values of the mobile phone in each direction, which are generated when the user picks up or puts down the mobile phone, are collected, and the statistical values are used as base values ($g_{x-base}$, $g_{y-base}$, and $g_{z-base}$) of the acceleration in each direction. Meanwhile, statistics of the use habits of most users are collected, and the probability of the mobile phone moving in each direction when the user picks up or puts down the mobile phone is measured. The weight is allocated according to the movement probability. If the probability is higher, the acceleration in this direction imposes a higher impact on the setting of the switch-on time point of the proximity sensor. After statistics are collected, the weight value ($K_x$, $K_y$, and $K_z$) of the acceleration in each direction may be obtained. For example, according to the statistics, $K_x$, $K_y$, and $K_z$ may be 1, 3, and 6, respectively. The component acceleration of the mobile phone in the upright direction has a higher impact on the switch-on time point than the component acceleration in the other two directions.

The mobile phone may use an acceleration sensor in the mobile phone to obtain the component acceleration in the first direction, the component acceleration in the second direction, and the component acceleration in the third direction of the mobile phone. Generally, existing mobile phones equipped with a proximity sensor have an acceleration sensor, and the acceleration sensor is always on. Therefore, the embodiment needs no additional hardware, and the current consumed by the acceleration sensor is less than the current consumed by the proximity sensor, and hence no additional increase of the current is caused.

Step 205: Switch on the proximity sensor at the switch-on time point.

After the proximity sensor is switched off, the proximity sensor is switched on again according to the switch-on time point obtained in step 204, and then a backlight of the mobile phone is turned on or off according to a detection result of the proximity sensor.

If the time interval is less than or equal to a time segment of a timer, the proximity sensor is switched on immediately, where the timer starts when the proximity sensor is switched off; if the time interval is greater than the time segment of the timer, the proximity sensor is switched on when the time segment of the timer becomes equal to the time interval. Specifically, the time segment of the timer refers to a time segment measured by the timer after the proximity sensor is switched off.

It should be noted that in the embodiment, activating the proximity sensor is different from switching on the proximity sensor; activating the proximity sensor is an one-off action performed at the beginning of a conversation process, but switching on the proximity sensor is a periodical action in the conversation process.

Step 206: Determine a distance between the mobile phone and the human face according to the proximity sensor that is switched on. If the mobile phone is approaching the human face, proceed to step 207; if the mobile phone is leaving the human face, proceed to step 208.

Step 207: Turn off the backlight of the mobile phone, and switch off the proximity sensor after a preset duration, and then proceed to step 209.

Step 208: Turn on the backlight of the mobile phone, and switch off the proximity sensor after the preset duration, and then proceed to step 209.

Step 209: Determine whether the conversation is complete. If yes, switch off the proximity sensor; if no, repeat step 204 until the conversation is complete and then switch off the proximity sensor. It should be noted that here switching off the proximity sensor is a term relative to activating the proximity sensor; after being switched off here, the proximity sensor may not be switched on periodically unless a condition for activating the proximity sensor is triggered.

Considering normal use habits of most users, it is less probable that the mobile phone moves vertically in a conversation process in most circumstances, but when the user picks up or puts down the mobile phone, it is more probable that the mobile phone moves in an upright direction and less moves in a horizontal direction. Therefore, the embodiment of the present invention may use the acceleration sensor to obtain the acceleration of the mobile phone in each direction, and set the time interval of switching on the proximity sensor by considering the probability of the mobile phone moving in each direction. If it is more probable that the mobile phone may be picked up or put down, the time interval of switching on the proximity sensor is shortened to improve sampling precision; if it is less probable that the mobile phone may be picked up and put down, the time interval of switching on the proximity sensor is prolonged to save battery power. Therefore, it is not necessary to let the proximity sensor be always on, and the electric current consumed by emitting infrared rays at the time of switching on the proximity sensor is saved to a great extent. Especially, after the mobile phone is picked up and moved toward the human face, the conversation continues for a period of time in most circumstances, and the mobile phone seldom moves vertically in the period. If the proximity sensor is always on in the period, much electric current may be consumed futilely.

In the embodiment of the present invention, an acceleration sensor works with a proximity sensor to determine whether the mobile phone is approaching or leaving the human face in a conversation process, and adjust the switch-on time point of the proximity sensor by considering the weight of the acceleration of the mobile phone in each direction when the user picks up or puts down the mobile phone, so as to shorten the duration of the proximity sensor being active and reduce power consumption of the mobile phone. The embodiment may be implemented by modifying software on the basis of existing hardware, and is cost-effective and easy to implement.

Persons of ordinary skills in the art may understand that all or part of steps of the methods in the embodiments may be implemented by a computer program instructing relevant hardware. The program may be stored in a computer readable storage medium. When the program is run, the steps of the methods in the embodiment are performed. The above storage medium includes various mediums capable of storing program code, such as a read-only memory (ROM), a random access memory (RAM), a magnetic disk or an optical disk.

Figure 3:
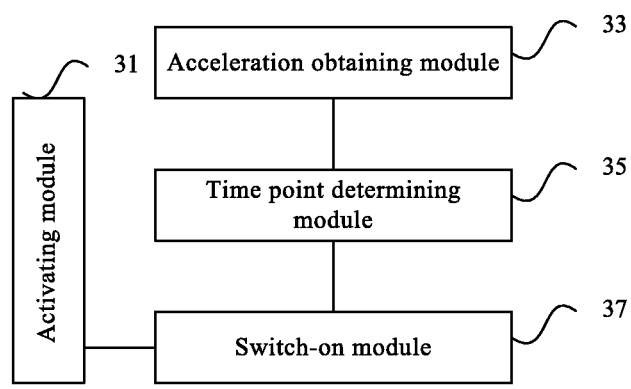
FIG. 3 is a schematic diagram of an apparatus for reducing power consumption of a mobile phone according to Embodiment 1 of the present invention.

FIG. 3 is a schematic diagram of an apparatus for reducing power consumption of a mobile phone according to Embodiment 1 of the present invention. As shown in FIG. 3, the apparatus includes an activating module 31, an acceleration obtaining module 33, a time point determining module 35, and a switch-on module 37.

The activating module 31 is configured to activate a proximity sensor of a mobile phone when a call is originated or received.

The acceleration obtaining module 33 is configured to obtain a weighted acceleration of the mobile phone by using an acceleration sensor.

The time point determining module 35 is configured to determine a switch-on time point of the proximity sensor according to the weighted acceleration of the mobile phone that is obtained by the acceleration obtaining module 33. For example, the determining a switch-on time point of the proximity sensor according to the weighted acceleration of the mobile phone that is obtained by the acceleration obtaining module 33 includes: using a current time point as the switch-on time point, that is, switching on the proximity sensor immediately, if the weighted acceleration of the mobile phone is greater than or equal to a preset threshold.

The switch-on module 37 is configured to switch on the proximity sensor at the switch-on time point determined by the time point determining module 35 so that a backlight of the mobile phone is turned on or off according to a detection result of the proximity sensor.

The apparatus for reducing power consumption of a mobile phone in the embodiment is used to implement the method shown in FIG. 1. For the working process and the working principles of each module in the embodiment, reference may be made to the description in the method embodiment shown in FIG. 1, and no repeated description is provided here.

In the embodiment of the present invention, in a conversation process of the mobile phone, a time point determining module may obtain a switch-on time point of a proximity sensor according to a weighted acceleration of the mobile phone, and a switch-on module switches on the proximity sensor according to the switch-on time point to detect whether the mobile phone is approaching or leaving a human face. In this way, an appropriate switch-on time point is obtained according to different weighted accelerations of the mobile phone, and it is not necessary to maintain a fixed switch-on time point of the proximity sensor. For example, when the mobile phone is not moving, the switch-on time point may be deferred so as to reduce power consumption of the mobile phone in a conversation.

Figure 4:
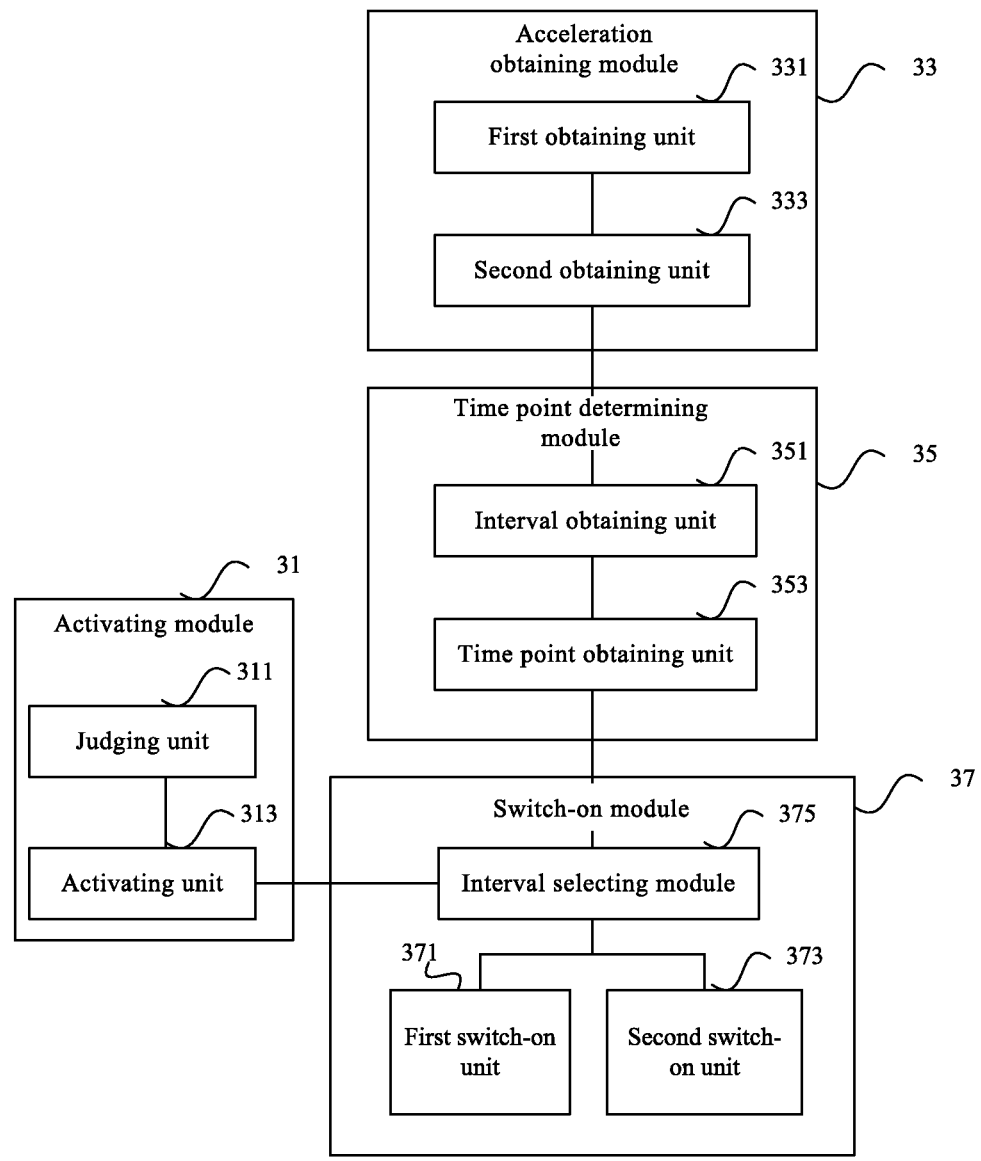
FIG. 4 is a schematic diagram of an apparatus for reducing power consumption of a mobile phone according to Embodiment 2 of the present invention.

FIG. 4 is a schematic diagram of an apparatus for reducing power consumption of a mobile phone according to Embodiment 2 of the present invention. On the basis of the embodiment shown in FIG. 3, as shown in FIG. 4.

The acceleration obtaining module 33 includes a first obtaining unit 331 and a second obtaining unit 333.

The first obtaining unit 331 is configured to obtain a component acceleration in a first direction, a component acceleration in a second direction, and a component acceleration in a third direction of the mobile phone.

The second obtaining unit 333 is configured to obtain the weighted acceleration according to the component acceleration in the first direction, the component acceleration in the second direction, and the component acceleration in the third direction of the mobile phone, which are obtained by the first obtaining unit 331, and according to a weight value of the component acceleration in the first direction, a weight value of the component acceleration in the second direction, and a weight value of the component acceleration in the third direction, where the first direction, the second direction, and the third direction are perpendicular to each other.

Further, the time point determining module 35 may be specifically configured to determine a time interval; the time interval determined by the time point determining module is smaller if the weighted acceleration of the mobile phone is greater, and the time interval refers to a time segment from switching off the proximity sensor to switching on the proximity sensor; the time interval determined by the time point determining module is greater if the weighted acceleration of the mobile phone is smaller; and the switch-on time point is a time point when the time interval expires after a time point of switching off the proximity sensor.

In another implementation manner, the time point determining module 35 may include an interval obtaining unit 351 and a time point obtaining unit 353.

The interval obtaining unit 351 is configured to obtain a component acceleration in a first direction, a component acceleration in a second direction, and a component acceleration in a third direction of the mobile phone, and obtain a time interval according to formula 1. The time point obtaining unit 353 is configured to obtain the switch-on time point according to the time interval obtained by the interval obtaining unit 351, where the switch-on time point is a time point when the time interval expires after the time point of switching off the proximity sensor.

Formula 1 is: $T=T_{base}*(K_x*g_{x\text{-}base}+K_y*g_{y\text{-}base}+K_z*g_{z\text{-}base})/(K_x*g_x+K_y*g_y+K_z*g_z)$, where T is the time interval; $T_{base}$ is a base value of the time interval; $g_x$, $g_y$, and $g_z$ are the component acceleration in the first direction, the component acceleration in the second direction, and the component acceleration in the third direction of the mobile phone, respectively; $g_{x\text{-}base}$, $g_{y\text{-}base}$, and $g_{z\text{-}base}$ are a base value of the component acceleration in the first direction, a base value of the component acceleration in the second direction, and a base value of the component acceleration in the third direction of the mobile phone, respectively; $K_x$ is a weight value in the first direction, $K_y$ is a weight value in the second direction, and $K_z$ is a weight value in the third direction; and the first direction, the second direction, and the third direction are perpendicular to each other.

Further, the switch-on module 37 includes a first switch-on unit 371 and a second switch-on unit 373.

The first switch-on unit 371 is configured to switch on the proximity sensor immediately if the time interval is less than or equal to a time segment of a timer, where the timer starts when the proximity sensor is switched off. The second switch-on unit 373 is configured to switch on the proximity sensor when the time segment of the timer becomes equal to the time interval if the time interval is greater than the time segment of the timer.

Further, the switch-on module 37 may include an interval selecting module 375.

The interval selecting module 375 is configured to use a preset maximum value as a time interval if the time interval is greater than the preset maximum value, or use a preset minimum value as a time interval if the time interval is less than the preset minimum value, where the maximum value and the minimum value of the time interval are preset.

In a specific implementation manner, the activating module 31 may be specifically configured to activate the proximity sensor of the mobile phone if the weighted acceleration of the mobile phone is greater than or equal to a preset threshold when a call is originated or received.

In another specific implementation manner, the activating module 31 may specifically include a judging unit 311 and an activating unit 313.

The judging unit 311 is configured to determine whether the mobile phone is in an earpiece mode or a handsfree mode when a call is originated or received.

The activating unit 313 is configured to activate the proximity sensor of the mobile phone if the mobile phone is in neither an earpiece mode nor a handsfree mode.

The judging unit 311 is further configured to determine whether the weighted acceleration of the mobile phone is greater than or equal to a preset threshold when a call is originated or received.

The activating unit 313 may be further configured to activate the proximity sensor of the mobile phone if the weighted acceleration of the mobile phone is greater than or equal to the preset threshold.

The apparatus for reducing power consumption of a mobile phone in the embodiment is used to implement the method shown in FIG. 1 or FIG. 2. For the working process and the working principles of each module in the embodiment, reference may be made to the description in the method embodiment shown in FIG. 1 or FIG. 2, and no repeated description is provided here.

In the embodiment of the present invention, an acceleration sensor works with a proximity sensor to determine whether the mobile phone is approaching or leaving the human face in a conversation process, and adjust the switch-on time point of the proximity sensor by considering the weight of the acceleration of the mobile phone in each direction when the user picks up or puts down the mobile phone, so as to shorten the duration of the proximity sensor being active and reduce power consumption of the mobile phone. The embodiment may be implemented by modifying software on the basis of existing hardware, and is cost-effective and easy to implement.

An embodiment of the present invention provides a mobile phone, which includes a proximity sensor and any one apparatus for reducing power consumption of a mobile phone that is provided in an embodiment of the present invention.

The mobile phone provided in the embodiment is used to implement the method shown in FIG. 1 or FIG. 2. For the working process and the working principles of the mobile phone in the embodiment, reference may be made to the description in the method embodiment shown in FIG. 1 or FIG. 2, and no repeated description is provided here.

With the mobile phone provided in the embodiment of the present invention, an acceleration sensor works with a proximity sensor to determine whether the mobile phone is approaching or leaving the human face in a conversation process, and adjust the switch-on time point of the proximity sensor by considering the weight of the acceleration of the mobile phone in each direction when the user picks up or puts down the mobile phone, so as to shorten the duration of the proximity sensor being active and reduce power consumption of the mobile phone. The embodiment may be implemented by modifying software on the basis of existing hardware, and is cost-effective and easy to implement.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof; without departing from the spirit and scope of the technical solutions of the embodiments of the present invention.

What is claimed is:

1. A method for reducing power consumption of a mobile phone, the method comprising:
   activating a proximity sensor of a mobile phone when a call is originated or received, wherein the proximity sensor is configured to switch off after a preset duration after the activating;
   obtaining a weighted acceleration of the mobile phone by using an acceleration sensor;
   determining a switch-on time point of the proximity sensor according to the weighted acceleration of the mobile phone; and
   after the switching off, switching on the proximity sensor at the switch-on time point.

2. The method according to claim 1, wherein the obtaining a weighted acceleration of the mobile phone comprises:
   obtaining a component acceleration in a first direction, a component acceleration in a second direction, and a component acceleration in a third direction of the mobile phone; and
   obtaining the weighted acceleration according to the component acceleration in the first direction, the component acceleration in the second direction, and the component acceleration in the third direction of the mobile phone, and according to a weight value of the component acceleration in the first direction, a weight value of the component acceleration in the second direction, and a weight value of the component acceleration in the third direction, wherein the first direction, the second direction, and the third direction are perpendicular to each other.

3. The method according to claim 2, wherein the determining the switch-on time point of the proximity sensor according to the weighted acceleration of the mobile phone comprises:
   letting a time interval be smaller if the weighted acceleration of the mobile phone is greater, wherein the time interval refers to a time segment from switching off the proximity sensor to switching on the proximity sensor; and
   letting the time interval be greater if the weighted acceleration of the mobile phone is smaller, wherein the switch-on time point is a time point when the time interval expires after a time point of switching off the proximity sensor.

4. The method according to claim 2, wherein the determining the switch-on time point of the proximity sensor according to the weighted acceleration of the mobile phone comprises:
   obtaining the component acceleration in the first direction, the component acceleration in the second direction, and the component acceleration in the third direction of the mobile phone, and obtaining a time interval according to a formula, wherein
   the formula is: $T = T_{base} * (K_x * g_{x\text{-}base} + K_y * g_{y\text{-}base} + K_z * g_{z\text{-}base}) / (K_x * g_x + K_y * g_y + K_z * g_z)$, wherein T is the time interval; $T_{base}$ is a base value of the time interval; $g_x$, $g_y$, and $g_z$ are the component acceleration in the first direction, the component acceleration in the second direction, and the component acceleration in the third direction of the mobile phone, respectively; $g_{x\text{-}base}$, $g_{y\text{-}base}$, and $g_{z\text{-}base}$ are a base value of the component acceleration in the first direction, a base value of the component acceleration in the second direction, and a base value of the component acceleration in the third direction of the mobile phone, respectively; $K_x$ is a weight value in the first direction, $K_y$ is a weight value in the second direction, and $K_z$ is a weight value in the third direction; and the first direction, the second direction, and the third direction are perpendicular to each other; and
   obtaining the switch-on time point according to the time interval, wherein the switch-on time point is a time point when the time interval expires after a time point of switching off the proximity sensor.

5. The method according to claim 4, wherein the switching on the proximity sensor at the switch-on time point comprises:
   switching on the proximity sensor immediately if the time interval is less than or equal to a time segment of a timer, wherein the timer starts when the proximity sensor is switched off; and
   switching on the proximity sensor when the time segment of the timer becomes equal to the time interval if the time interval is greater than the time segment of the timer.

6. The method according to claim 5, wherein the switching on the proximity sensor at the switch-on time point further comprises:
   presetting a maximum value and a minimum value of the time interval; and
   using the preset maximum value as the time interval if the time interval is greater than the preset maximum value; and
   using the preset minimum value as the time interval if the time interval is less than the preset minimum value.

7. The method according to claim 1, wherein the activating the proximity sensor of the mobile phone when a call is originated or received comprises:
   activating the proximity sensor of the mobile phone if the weighted acceleration of the mobile phone is greater than or equal to a preset threshold when the call is originated or received.

8. The method according to claim 1, further comprising setting a backlight of the mobile phone in an on state or an off state according to a detection result of the proximity sensor.

9. The method according to claim 1, wherein the determining the switch-on time point of the proximity sensor according to the weighted acceleration of the mobile phone comprises:

determining a time interval from switching off the proximity sensor to switching on the proximity sensor, wherein the time interval is determined to be smaller than a base time interval if the weighted acceleration of the mobile phone is greater than a threshold, and wherein the time interval is determined to be greater than the base time interval if the weighted acceleration of the mobile phone is smaller than the threshold.

10. An apparatus for reducing power consumption of a mobile phone, the apparatus comprising:
   an activating module configured to activate a proximity sensor of a mobile phone when a call is originated or received, wherein the proximity sensor is configured to be switched off after a preset duration after the activation;
   an acceleration obtaining module configured to obtain a weighted acceleration of the mobile phone by using an acceleration sensor;
   a time point determining module configured to determine a switch-on time point of the proximity sensor according to the weighted acceleration of the mobile phone; and
   a switch-on module configured to switch on the proximity sensor at the switch-on time point after the switching off.

11. The apparatus according to claim 10, wherein the acceleration obtaining module comprises:
   a first obtaining unit configured to obtain a component acceleration in a first direction, a component acceleration in a second direction, and a component acceleration in a third direction of the mobile phone; and
   a second obtaining unit configured to obtain the weighted acceleration according to the component acceleration in the first direction, the component acceleration in the second direction, and the component acceleration in the third direction of the mobile phone, and according to a weight value of the component acceleration in the first direction, a weight value of the component acceleration in the second direction, and a weight value of the component acceleration in the third direction, wherein the first direction, the second direction, and the third direction are perpendicular to each other.

12. The apparatus according to claim 11, wherein:
   the time point determining module is configured to determine a time interval, wherein: the time interval determined by the time point determining module is smaller if the weighted acceleration of the mobile phone is greater, and the time interval refers to a time segment from switching off the proximity sensor to switching on the proximity sensor; the time interval determined by the time point determining module is greater if the weighted acceleration of the mobile phone is smaller; and the switch-on time point is a time point when the time interval expires after a time point of switching off the proximity sensor.

13. The apparatus according to claim 11, wherein the time point determining module comprises:
   an interval obtaining unit configured to obtain a component acceleration in a first direction, a component acceleration in a second direction, and a component acceleration in a third direction of the mobile phone, and obtain a time interval according to a formula; and
   a time point obtaining unit configured to obtain the switch-on time point according to the time interval, wherein the switch-on time point is a time point when the time interval expires after a time point of switching off the proximity sensor; wherein
   the formula is: $T = T_{base} * (K_x * g_{x-base} + K_y * g_{y-base} + K_z * g_{z-base}) / (K_x * g_x + K_y * g_y + K_z * g_z)$, wherein T is the time interval; $T_{base}$ is a base value of the time interval; $g_x$, $g_y$, and $g_z$ are the component acceleration in the first direction, the component acceleration in the second direction, and the component acceleration in the third direction of the mobile phone, respectively; $g_{x-base}$, $g_{y-base}$, and $g_{z-base}$ are a base value of the component acceleration in the first direction, a base value of the component acceleration in the second direction, and a base value of the component acceleration in the third direction of the mobile phone, respectively; $K_x$ is a weight value in the first direction, $K_y$ is a weight value in the second direction, and $K_z$ is a weight value in the third direction; and the first direction, the second direction, and the third direction are perpendicular to each other.

14. The apparatus according to claim 13, wherein the switch-on module comprises:
   a first switch-on unit configured to switch on the proximity sensor immediately if the time interval is less than or equal to a time segment of a timer, wherein the timer starts when the proximity sensor is switched off; and
   a second switch-on unit configured to switch on the proximity sensor when the time segment of the timer becomes equal to the time interval if the time interval is greater than the time segment of the timer.

15. The apparatus according to claim 10, wherein:
   the activating module is configured to activate the proximity sensor of the mobile phone if the weighted acceleration of the mobile phone is greater than or equal to a preset threshold when the call is originated or received.

16. A mobile phone comprising a proximity sensor and an apparatus for reducing power consumption of a mobile phone, the apparatus comprising:
   an activating module configured to activate the proximity sensor of a mobile phone when a call is originated or received, wherein the proximity sensor is configured to switch off after a preset duration after the activation;
   an acceleration obtaining module configured to obtain a weighted acceleration of the mobile phone by using an acceleration sensor;
   a time point determining module configured to determine a switch-on time point of the proximity sensor according to the weighted acceleration of the mobile phone; and
   a switch-on module configured to switch on the proximity sensor at the switch-on time point after the switching off.

17. The mobile phone according to claim 16, wherein the acceleration obtaining module comprises:
   a first obtaining unit configured to obtain a component acceleration in a first direction, a component acceleration in a second direction, and a component acceleration in a third direction of the mobile phone; and
   a second obtaining unit configured to obtain the weighted acceleration according to the component acceleration in the first direction, the component acceleration in the second direction, and the component acceleration in the third direction of the mobile phone, and according to a weight value of the component acceleration in the first direction, a weight value of the component acceleration in the second direction, and a weight value of the component acceleration in the third direction, wherein the first direction, the second direction, and the third direction are perpendicular to each other.

18. The mobile phone according to claim 17, wherein:
   the time point determining module is configured to determine a time interval, wherein: the time interval determined by the time point determining module is smaller if the weighted acceleration of the mobile phone is greater, and the time interval refers to a time segment from switching off the proximity sensor to switching on the proximity sensor; the time interval determined by the time point determining module is greater if the weighted acceleration of the mobile phone is smaller; and the switch-on time point is a time point when the time interval expires after a time point of switching off the proximity sensor.

19. The mobile phone according to claim 17, wherein the time point determining module comprises:
an interval obtaining unit configured to obtain a component acceleration in a first direction, a component acceleration in a second direction, and a component acceleration in a third direction of the mobile phone, and obtain a time interval according to a formula; and
a time point obtaining unit configured to obtain the switch-on time point according to the time interval, wherein the switch-on time point is a time point when the time interval expires after a time point of switching off the proximity sensor; wherein
the formula is: $T = T_{base} * (K_x * g_{x-base} + K_y * g_{y-base} + K_z * g_{z-base}) / (K_x * g_x + K_y * g_y + K_z * g_z)$, wherein T is the time interval; $T_{base}$ is a base value of the time interval; $g_x$, $g_y$, and $g_z$ are the component acceleration in the first direction, the component acceleration in the second direction, and the component acceleration in the third direction of the mobile phone, respectively; $g_{x-base}$, $g_{y-base}$, and $g_{z-base}$ are a base value of the component acceleration in the first direction, a base value of the component acceleration in the second direction, and a base value of the component acceleration in the third direction of the mobile phone, respectively; $K_x$ is a weight value in the first direction, $K_y$ is a weight value in the second direction, and $K_z$ is a weight value in the third direction; and the first direction, the second direction, and the third direction are perpendicular to each other.

20. The mobile phone according to claim 16, wherein:
the time point determining module is configured to determine a time interval, wherein: the time interval determined by the time point determining module is smaller than a base time interval if the weighted acceleration of the mobile phone is greater than a threshold, and wherein the time interval determined by the time point determining module is greater than the base time interval if the weighted acceleration of the mobile phone is smaller than the threshold.

* * * * *